United States Patent
Long

(10) Patent No.: US 9,833,961 B2
(45) Date of Patent: Dec. 5, 2017

(54) EXTRACTING-SQUEEZING-COMPRESSING EQUIPMENT USED FOR MUNICIPAL SOLID WASTE MIXTURE

(71) Applicant: Orion Enterprise International LLC, La Verne, CA (US)

(72) Inventor: Nguyen Gia Long, Ha Noi (VN)

(73) Assignee: ORION ENTERPRISE INTERNATIONAL LLC, La Verne, CA (US)

( * ) Notice: Subject to any disclaimer, the term of this patent is extended or adjusted under 35 U.S.C. 154(b) by 337 days.

(21) Appl. No.: 14/518,249

(22) Filed: Oct. 20, 2014

(65) Prior Publication Data
US 2015/0283778 A1  Oct. 8, 2015

(30) Foreign Application Priority Data
Apr. 2, 2014  (VN) ................ 1-2014-01073

(51) Int. Cl.
| | |
|---|---|
| B30B 9/12 | (2006.01) |
| B30B 9/14 | (2006.01) |
| B30B 9/26 | (2006.01) |
| B30B 9/28 | (2006.01) |
| B30B 15/00 | (2006.01) |
| B30B 15/34 | (2006.01) |

(52) U.S. Cl.
CPC ............ B30B 9/124 (2013.01); B30B 9/12 (2013.01); B30B 9/14 (2013.01); B30B 9/26 (2013.01); B30B 9/28 (2013.01); B30B 15/0005 (2013.01); B30B 15/34 (2013.01); Y02E 50/10 (2013.01); Y02E 50/30 (2013.01)

(58) Field of Classification Search
CPC .. B30B 9/124; B30B 9/12; B30B 9/14; B30B 15/0005; B30B 15/34; B30B 9/26; B30B 9/28; Y02E 50/10; Y02E 50/30
USPC ........................................ 100/117
See application file for complete search history.

(56) References Cited

U.S. PATENT DOCUMENTS

| | | | | |
|---|---|---|---|---|
| 780,415 A | * | 1/1905 | Eavenson | B29C 47/38 100/125 |
| 1,467,737 A | * | 9/1923 | Schueler | B30B 9/128 100/125 |
| 1,902,738 A | * | 3/1933 | Tuttle | B30B 9/12 100/126 |

(Continued)

Primary Examiner — Jimmy T Nguyen
Assistant Examiner — Joseph Finan, Jr.
(74) Attorney, Agent, or Firm — Myers Wolin, LLC

(57) ABSTRACT

The present disclosure encompasses a machine for extracting, squeezing, compressing and compacting a mixture of municipal solid waste to provide both an organic-rich liquid and solid RDF pellets, separately. The machine comprises a stepless hydraulic power transmission module and a press and squeeze compression module. The body of the machine comprises a waste-inlet on one end, followed by a water separation zone, a wet organic substance pressing zone, a heat and steam pressing zone, and an RDF molding and pelletizing zone. The machine also comprises a press-and-squeeze shaft having a conical cylindrical shape with an ascending diameter including a shaft body and a helix screw. The helix screw with multi-spiral forward steps and multi-spiral backward steps, with the spiral steps (distance between and among them) becoming smaller toward the bigger end of the body.

12 Claims, 4 Drawing Sheets

(56) References Cited

U.S. PATENT DOCUMENTS

| | | | | |
|---|---|---|---|---|
| 2,466,492 A * | 4/1949 | Sizer | ............... | B30B 9/12 |
| | | | | 100/110 |
| 3,126,818 A * | 3/1964 | Koelsch | ............... | B30B 9/121 |
| | | | | 100/112 |
| 3,478,679 A * | 11/1969 | Bauserman | ............... | B30B 9/121 |
| | | | | 100/117 |
| 3,578,740 A * | 5/1971 | Redding | ............... | B29B 9/065 |
| | | | | 425/313 |
| 4,214,947 A * | 7/1980 | Berger | ............... | B30B 9/12 |
| | | | | 100/146 |
| 5,232,649 A * | 8/1993 | Andersen | ............... | B29B 15/06 |
| | | | | 159/2.1 |
| 5,939,124 A * | 8/1999 | Wenger | ............... | B30B 11/005 |
| | | | | 426/516 |
| 2009/0286643 A1 * | 11/2009 | Brown | ............... | F16H 37/022 |
| | | | | 475/127 |
| 2013/0199383 A1 * | 8/2013 | Horton | ............... | B30B 9/121 |
| | | | | 100/37 |

* cited by examiner

EXTRACTING-SQUEEZING-COMPRESSING EQUIPMENT USED FOR MUNICIPAL SOLID WASTE MIXTURE

CROSS REFERENCE TO RELATED APPLICATIONS

This application claims priority to Vietnamese Patent Application Serial No. VN 1-2014-01073 filed Apr. 2, 2014, the contents of which are hereby incorporated by reference in their entirety.

FIELD

The present invention relates to equipment, machinery, and a process for the preparation of solid dry refuse derived fuel (RDF) pellets and a moist, organic-rich material from municipal waste. The process comprises extracting, squeezing, compressing, and compacting municipal solid waste into moist organic-rich material (liquid) and dry, solid RDF pellets.

BACKGROUND

Existing compression equipment and technology for treatment of waste materials generally rely upon the application of screw presses, hydraulic presses, and friction presses, to homogeneous materials. In fact, these art disclosed technologies are generally optimized for—and limited to—treatment of homogenous materials. Accordingly, when existing compression equipment and technology are applied to the non-homogeneous mixtures of municipal solid waste, these processes are generally characterized by lower yields and relatively poor economic returns; i.e., they are less efficient.

Municipal solid waste however is not homogeneous. Rather, it includes domestic waste, industrial waste and/or agricultural waste, and is a mixture of organic materials, fibers, rags, cloth, rubber, leather, nylon, food scraps, twigs trees, wrapping paper etc. Municipal solid waste is also characterized by a high moisture content and capable of rapid spoilage and/or putrefaction, which have always been problems for all mankind One approach to dealing with this type of waste mixture (other than by disposal in a landfill or an incinerator) is discussed in Vietnamese Patent No. 9680, awarded September 2011 that is entitled "The Pelletization System for Municipal Solid Waste." However, this pelletization system handles mainly municipal solid waste in various processing stages with a series of specialized systems and equipment designed to separate the waste mixture into various homogeneous and partially dry organic waste fractions.

However, some components of such a municipal waste stream, such as rags, fabric, yarn and nylon waste and the like in the mixture cannot be effectively compressed, due to their low friction character, and therefore they usually must be separated out from the mixture.

Accordingly, there is a need for equipment, machinery, and processes for the cost-effective treatment of waste materials including mixed component municipal solid wastes.

BRIEF SUMMARY

The present disclosure provides "all-in-one extracting-squeezing and compressing equipment" (machine) that can use unsorted, heterogeneous municipal solid waste as input and convert this waste into dry solid RDF pellets as well as an organic-rich mixture, substance, or liquid that can be processed into methane gas.

To achieve these goals, the machine of the present disclosure has been designed to use various forces to press and squeeze the waste materials. The design (exemplified in FIG. 1) comprises: a stepless hydraulic power transmission module (1), and a press and squeeze compression module (2).

In one embodiment (again as exemplified in FIG. 1), the stepless power hydraulic transmission module (1) includes: a hydraulic source unit (10), and a stepless power hydraulic transmission unit (20). The hydraulic source unit (10) is configured to include: hydraulic oil tank with oil pump (11); a hydraulic oil cooler (12) which is inserted into an oil tank (11); an electric motor (13) with output shaft which is connected to the oil tank and oil pump; a two-directional controller (14) which is connected to the oil tank; and a pair of oil pipes (15) with one head connected to the two-directional controller (14) to supply and control the distribution of oil, and with the other head connected to the stepless power hydraulic transmission unit (20). The two-directional controller (14) includes an oil distribution valve and a pressure regulator valve.

In one embodiment (again as exemplified in FIG. 1), the stepless hydraulic power transmission unit (20) is configured to include: a gear box (21); a stepless hydro turbine (22) with output shaft connected to the gearbox (21) and the input shaft connected to the pair of oil pipes (15).

In another embodiment, (again referring to the illustrative machine of FIG. 1), the press-and-squeeze compression module (2), comprises: (a) structural case (30) designed with hollow cylindrical shaped body (31); and (b) a press-and-squeeze shaft (40) located to be rotatory inside the body (31).

According to this embodiment, (again referring to the illustrative machine of FIG. 1), the structural case (30) is built to include (a) a long hollow cylindrical shaped body (31); (b) a waste-inlet (32) placed on the opening of the body (31) at one end; (c) a water-separation zone (33) located at the open end of the waste hopper (32); (d) a press-and-squeeze zone to produce an organic-rich liquid (34) located next to the water-separation zone (33); (e) a heat-and-steam escape zone (35) located adjacent to the wet organic substance pressing zone (34); and an RDF molding-and-pelletizing zone (36) located right after the heat-and-steam escape zone (35) to produce the desired RDF pellets at the exit.

In one aspect of this embodiment, (referring to illustrative FIGS. 2 4) the water-separation zone (33), the wet organic substance pressing zone (34), and the heat-and-steam escape zone (35) are all designed and built with a defined concave profile on the inner wall of the cylindrical body (31) and with appropriate depth, to form the desired pressure relief recesses (331, 341, 351) and/or with pressure increasing need (332, 342, 352) alternating respectively. In certain aspects of this embodiment, several first water separating holes (333) are positioned in the pressure relief recess (331) to accommodate the pressure relief (331) in the water-separation zone (33). In another aspect of this embodiment, several other holes (343) are positioned in the pressure relief recess (341) to allow the wet organic mixture to be pressed and discharged as and organic rich liquid in the wet organic substance pressing zone (34). In a still further aspect of this embodiment, several holes (353) are also positioned in the pressure relief recess (351) to create an escape route for heat and steam (35) which are generated due to frictional pressure.

In another aspect of this embodiment, (referring to illustrative FIGS. 2 4), several holes (361) are positioned in the compression zone for shaping dry solid RDF pellets (36). The sizes and numbers of these holes (333, 343, 353, 361) which determine the desired sizes and shapes of the RDF pellets, can be customized.

In still another embodiment, (referring to the illustrative FIGS. 2 and 4), the present disclosure provides a machine in which the cylindrical body (31) is built with a connection flange (311) which is mounted to the gearbox (21) of the stepless power hydraulic transmission module (1). In one aspect of this embodiment, the waste-inlet (32) is built with a waste hopper (321) and is positioned on the perimeter (outer surface) of the cylindrical body (31). The funnel is concentric with the waste-inlet (32).

In still another embodiment, (referring to the illustrative FIGS. 1-4), the present disclosure provides a machine in which the press-and-squeeze-cylinder (40) has a cone-shaped cylinder with the gradually increasing diameter from the waste feeding portion. This cylinder is designed with a shaft body (41), the connecting shaft end (42) with diameter smaller than the shaft body. A blocking flange (43) is positioned between the shaft body (41) and the connecting shaft end (42). A helix screw (44) is built on the surface of the shaft body (41) with the appropriately-smaller steps reaching toward the end of the cylinder. In one aspect of this embodiment, the shaft body (41) of the press-squeeze-shaft (40) is also built with an open zone (411) which has a cone-shaped profile corresponding to the outer perimeter of the cylindrical body (31).

In a further aspect of this embodiment, the length of the open zone (411) corresponds to the total length of the pressure relief recess zone (331) of the water-separation zone (33), the wet organic substance pressing zone (34), the heat-and-steam escape zone (35, and the compressing and RDF pelletizing zone (36) of the structural case (30).

In another embodiment, (referring to the illustrative FIGS. 1-4), the present disclosure provides a machine comprising several second water discharge holes (412) formed in the shaft body (41) at the area corresponding to the pressure relief recess (311) of the water separation zone (33) of the structural case (30). In another aspect, the present disclosure provides a machine that comprises other second heat-and-steam discharge holes (413) that are also placed on the shaft body (41) at the area corresponding to the heat-and-steam release zone (35) of the structural case (30).

In one embodiment, (referring to the illustrative FIGS. 1-4), the present disclosure provides a machine in which the helix screw (44) is designed to create multi-spiral forward steps (441) as well as multi-spiral backward steps (442). In one aspect, it is also designed for each spiral backward step (442) to be equal to ¼ of a spiral forward step (441). The spiral backward step is arranged on the shaft body (41) at the corresponding position in zones (331, 321, 341, 351). An appropriate space between the spiral forward step (441) and the spiral backward step (442) is created to form a squeezing power as well as the sliding frictions to generate the heat to boil water. The steam would evaporate at the heat-and-steam escape zone (35).

The equipment, machinery, and process of the present disclosure are efficient, e.g., because, with the structure of the press-and-squeeze compression module, any mixture of solid waste including heterogeneous municipal waste, and/or agricultural waste which may comprise organic materials, fibers, rags, cloth, rubber, leather, plastic, food scraps, twigs, wrappers etc. with a high moisture content and that is capable of rapid spoilage and/or putrefaction, can be processed together to produce an organic-rich liquid mixture as well as, at the same time, dry solid RDF pellets.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

The present disclosure provides equipment and processes for squeezing, compressing and compacting raw mixtures of dry and moist organic matter, that yield both an organic-rich fluid, which can be used for the production of methane gas, and a shaped, residual waste, in the form of dry solid RDF pellets for commercial or industrial use as renewed energy materials.

The invention will be described in detail as preferred embodiments with attached drawings. However, it should be understood that the invention may be amended, modified and replaced by professionals in related technical fields as to not deviate from the scope and the nature of the invention. Therefore, the scope of the invention is clearly defined by the attached drawings and claims.

Definitions

The phrase "mixture of moist organic substance" means a mixture of or comprising, organic materials from hydrated soft waste and wet solid waste materials, excluding fiber.

The phrase "dry solid RDF—Refuse Derived Fuels" means a mixture of or comprising, organic fiber mixture, inert waste and combustible matters.

Figure 1:
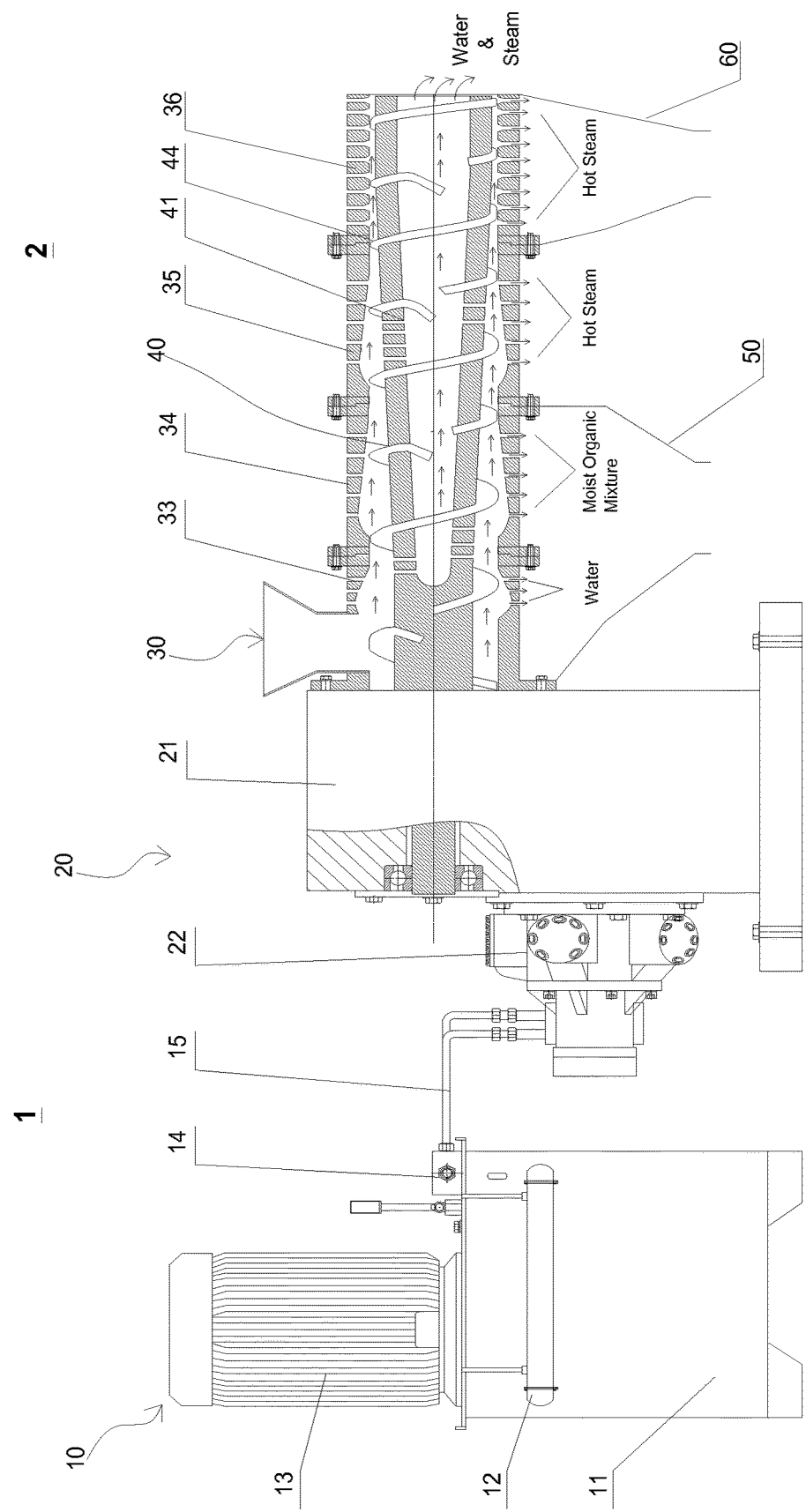
FIG. 1 depicts an RDF PELLETIZATION SYSTEM according to the disclosure with the side elevation partially removed to reveal structural elements thereof.

As shown in FIG. 1, the present disclosure provides a press-and-squeeze system that comprises a stepless power hydraulic transmission module (1); and a press and squeeze compression module (2). The system is utilized to press, squeeze and compress raw mixture of dry and moist organic matters, separate and shape the residual waste into dry solid RDF pellets.

As shown in FIG. 1, the stepless power hydraulic transmission module includes: the hydraulic source unit (10) and stepless power hydraulic transmission unit (20). The hydraulic source unit (10) is configured including a hydraulic oil tank (11).

The hydraulic oil cooler (12) is mounted to the hydraulic oil tank to cool down the oil tank (11). The electric motor (13) with the output positioned above the cylinder head with output shaft connected to the oil tank (11) and the bi-directional valve (14), positioned on the side, are also connected to the hydraulic oil tank (11). This is designed to control the supply and recovery of hydraulic oil to the stepless power hydraulic transmission unit (20).

A pair of oil pipes (15) with one head connected to the bi-directional valve (14) to supply and control the distribution of oil. The other head is connected to the stepless power hydraulic transmission unit (20). The bi-directional valves (14) includes hydraulic oil distribution valve and a pressure control valve.

The stepless power hydraulic transmission unit (20) is configured to include a gearbox (21) which is used to adjust the desired rotation speed of the press-squeeze-compression module (2). The stepless hydroturbine (22) with output shaft connected to the gearbox (21) and the input shaft connected to the pair of oil pipes (15) of the hydraulic source unit (10). The principle of operation of the stepless hydraulic power transmission module (1) of the present disclosure is not be described in greater detail herein, since the elements thereof are known in the art.

However, the main purpose of the operation of the stepless hydraulic power transmission module (1) of the present disclosure is described below.

With the need for pressing and squeezing a heterogeneous mixture of dry and wet solid waste materials using the same system, the driving force of the press-squeeze-compression module (2) satisfies this need. This module utilizes, adjusts, and modulates the torque pressure force as required by increasing or decreasing its rotating speed to reach the desired pressure. As a result, the stepless power hydraulic transmission module (1) achieves the purpose of the invention.

Figure 2:
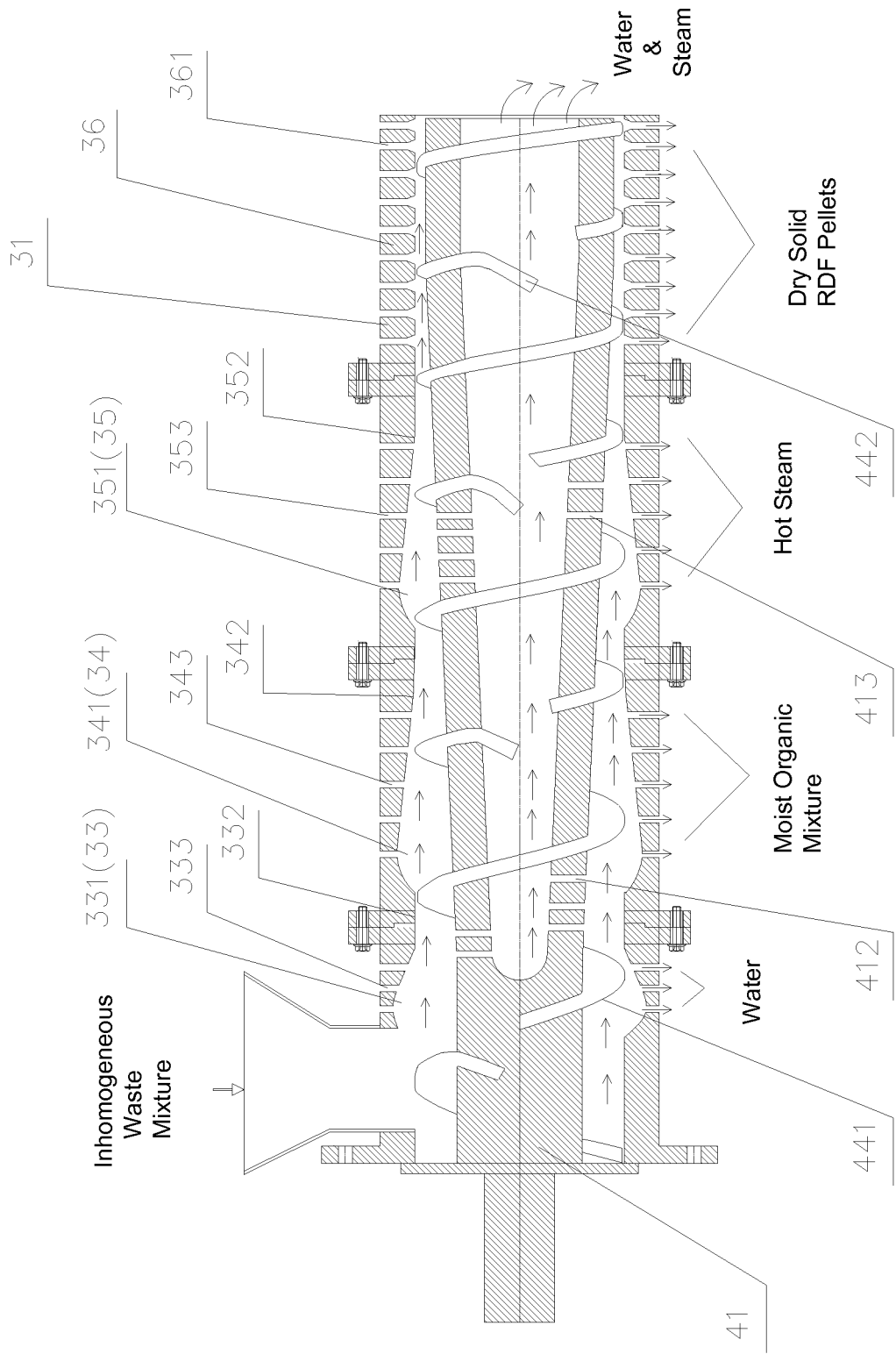
FIG. 2 provides a cross-sectional drawing depicting the press-and-squeeze compression module of an embodiment of an RDF PELLETIZATION SYSTEM of the disclosure.
Figure 3:
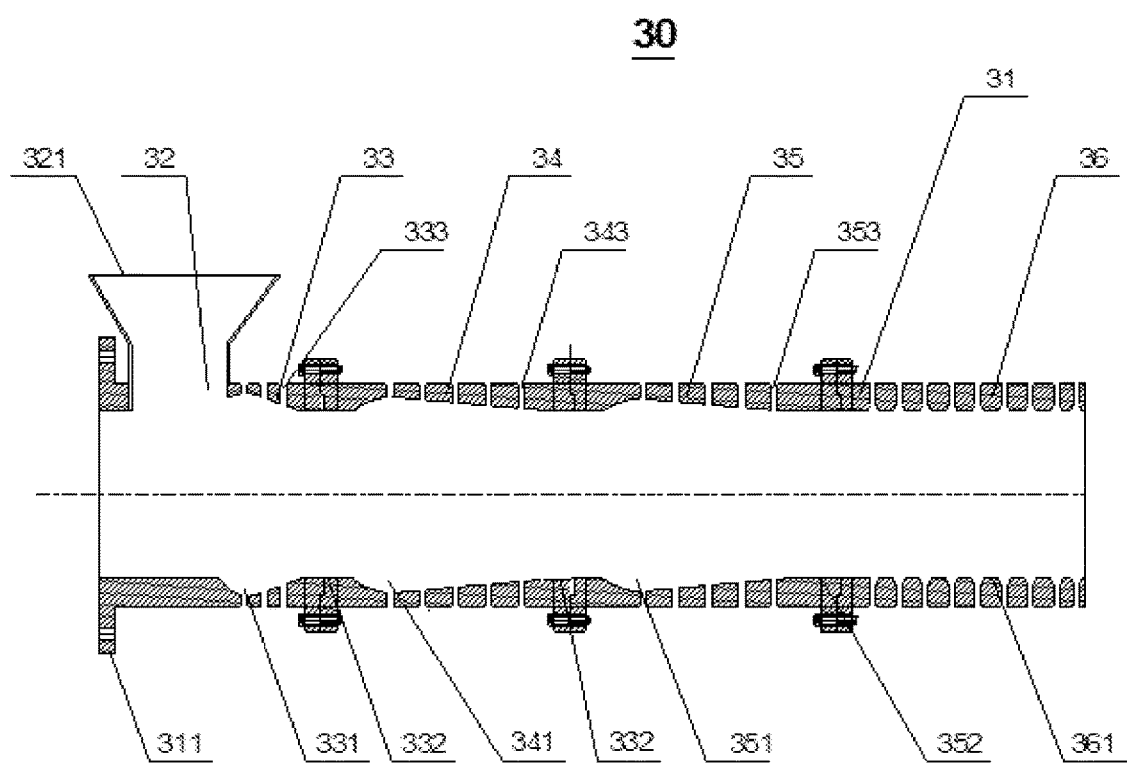
FIG. 3 provides a cross-sectional drawing depicting the structural case (30) of the press-and-squeeze compression module of an RDF PELLETIZATION SYSTEM of the disclosure.

As shown in FIG. 2, the press-squeeze-compression module (2) comprises: (a) a structural case (30) which is a long hollow circular cylinders; (b) and a press-and-squeeze shaft (40) which is located inside the structural case (30), and configured to rotate therein.

Figure 4:
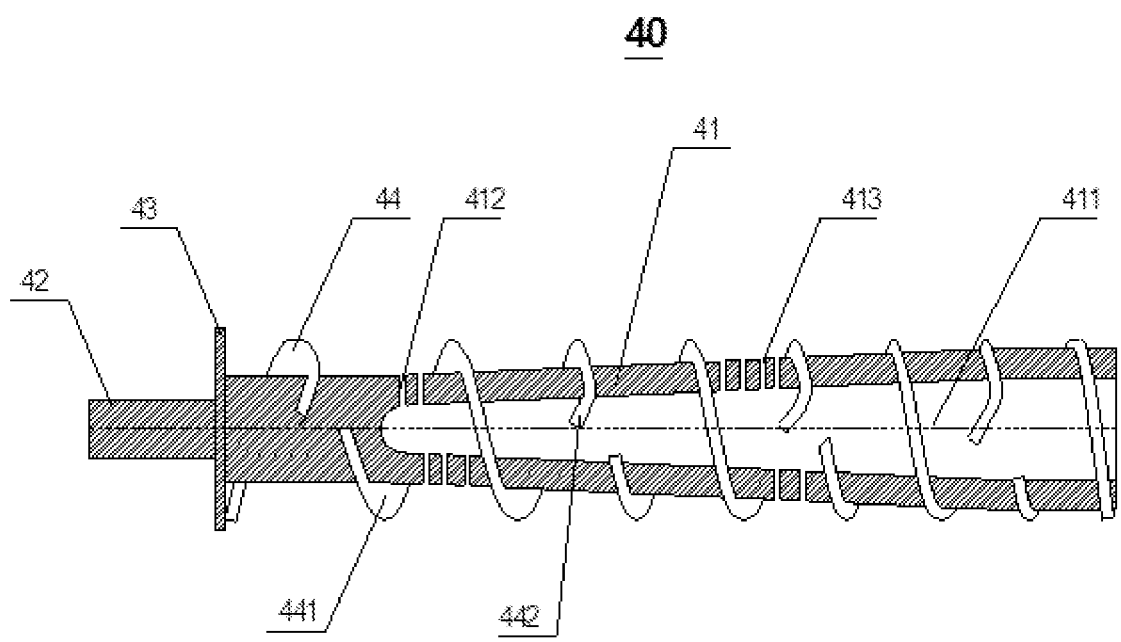
FIG. 4 provides a cross-sectional drawing depicting the press-squeeze-cylinder of an RDF PELLETIZATION SYSTEM of the disclosure.

As shown in FIG. 4, the structural case (30) comprises: (a) a long hollow cylindrical shaped body (31); (b) a waste-inlet which is placed on the opening of the body (31), (c) a water-separation zone (33) which is positioned on the small area of the body; (d) press-and-squeeze zone to produce organic-rich liquid (34) located next to the water-separation zone (33) on the bigger area of the body; (e) a heat and steam pressing zone (35) positioned adjacent to the wet organic substance pressing zone (34); and (f) an RDF molding-and-pelletizing zone (36) located right after the heat-and-steam pressing zone (35) to produce the RFD pellets at the exit.

According to one embodiment of the present disclosure, the water-separation zone (33), the wet organic substance pressing zone (34), and the heat and steam compression zone (35) all are designed with the appropriate curved and concave profile on the inner wall of the body (31). The curved and concaved indentations gradually get smaller to create the desired pressure relief for the alternating (331, 341, 351) pressure relief recess areas and the pressure increase areas (332, 342, 352) respectively.

According to another embodiment of the present disclosure, between the pressure relief area (331) of the water-separation zone (33) and the pressure relief area (341) of the wet organic substance pressing zone (34), a pressure increase is applied (332). Likewise, between the pressure relief area (341) of the wet organic substance pressing zone (34) and the pressure relief area (351) of the heat-and-steam escape zone (35), a pressure increase is applied (342). Finally, between the pressure relief area (351) of the heat-and-steam escape zone (35) and the RDF molding-and-pelletizing zone (36), a pressure increase is applied (352).

According to other embodiments, several primary water discharge holes (332) are positioned in the pressure relief recess (331) of the wet organic substance pressing zone (33) to drain water of the waste to outside area. Several organic liquid charging holes (343) were also positioned in the pressure relief recess area (341) of the wet organic substance pressing zone (34) to allow the organic-rich liquid to be squeezed out and exit to the exterior.

Several heat-and-steam charging holes (353) were also positioned in the heat-and-steam escape zone (35) to allow heat and steam to exit.

Several pelletizing holes (361) were finally positioned in the RDF molding-and-pelletizing zone (36) to press out the RDF pellets through these holes. The number and sizes of holes 333, 343, 352 and 361 can be customized.

According to certain embodiments of the present disclosure, the cylindrical shaped body (31) of the structural case (30) is made of four separate parts corresponding to the four separate zones: (a) the water separating pressing zone (33), (b) the wet organic substance pressing zone (34), (c) the heat-and-steam compressing zone (35) and (d) the RDF molding and pelletizing zone (36). These four separate zones are assembled together by flanges, screws, and bolts.

In addition, the body (31) is made with flanged connections (311) and is mounted onto the transmission gearbox (21) and stepless power hydraulic transmission module (1) by screws and bolts. The waste-inlet (32) with the waste hopper (321) is mounted on the perimeter of the case body (31) and is concentric with the waste-inlet (32).

As shown in FIGS. 1 and 2, the press-and-squeeze-cylinder (40) has a cone shaped cylinder with a diameter that increases steadily from the beginning zone where waste mixture is loaded. This cylinder is designed with a shaft body (41) where the first shaft part (42) and the helix screw (44) are placed on the surface of the shaft body with smaller diameter than its body shaft. A flanged block (43) of the press-and-squeeze cylinder (40) which has its diameter bigger than the diameter of the structural case (30). In particular, the flange block (43) of the press-and-squeeze trunk will make the pressure inward against the connection flange (311) of the structural case (30) making the fitting connection between the two.

According to other embodiments of the present disclosure, the shaft body (41) of the press-and-squeeze cylinder (40) is built with an open zone (411) and with a conical shape corresponding to the cone-shaped outer contour, and the length of the open zone (411) is at least equal to the total length of the body case (31) where the concave pressure relief recess (331) of the water-separation zone (33), the wet organic substance pressing zone (34) and the RDF molding-and-pelletizing zone (36) are situated. In one aspect of this embodiment, several second water charging holes (412) are included in the shaft body (41) at the area corresponding to the concave pressure relief recess (331) of the water-separation zone (33) of the body case (31). Therefore, while the mixture of waste is processed in the water-separation zone (33), water will be separated from the structural case (30) and drained through these second holes (413) and flow into the open zone (411) of the press-and-squeeze cylinder (40).

Furthermore, several steam-heat-charging holes (413) are positioned on the shaft body (41) at the area corresponding to the heat-and-steam compression zone (35) of the body case (31). When the water is pressed in the heat-and-steam compression zone (35) of the case (30) the heat and steam produced can be released through these steam-heat-charging holes (413) into the open zone (411) of the press-and-squeeze cylinder (40).

In another embodiment of the present disclosure, the helix screw (44) is designed with multi-forward spiral steps (441) to create the compression force with its crushing, squeezing and sliding friction on the waste mixture while the multi-backward spiral steps (442) with another compression force which creates static friction and produces pressing and pressurizing power which produces heat on the waste mixture. Of these, each backward spiral step (442) is equal to ¼ of the pressure created by each forward-spiral step (441). Moreover, each spiral step backward (441) of the screw is arranged on the press-and-squeeze-cylinder (40) at the relative location in the zones 33, 34, 35, 36 of the structural case (30). Between a forward-spiral step (441) and a backward spiral step (442) a space is designed to create the appropriate resistance and incremental sliding friction and at the same time to generate heat which causes water evaporation of the waste mixture.

In still another embodiment of the present disclosure, as shown in FIG. 1, the RDF pelletization system is designed to include a water collecting tray and an organic-rich liquid collecting tray (50). An RDF pellet-collecting tray is also added (60) on the lower end of the case (31).

The principle of operation of the RDF pelletization system is herein described as a system to handle or process a variety of waste mixture with undefined components, for example, e.g., a mixture of dry/wet solid waste with a variable water content.

In one embodiment, as shown in FIG. 2, the waste mixture is continuously fed into the waste hopper (321) of the structural case (30) and continuously processed through the water separation zone (33), the wet organic substance pressing zone (34), the heat-and-steam compression zone (35), and the RDF molding and pelletizing zone (36). More specifically, as shown by the arrows in the figure, the process comprises the following steps:

In the water separation zone (33) the first wave of waste mixture is rolled in and pressed forward by the forward spiral steps (441) and concurrently squeezed backward by the backward spiral steps (442) in the gap between the shaft body (41) and the inner wall of the structural case (30). The waste mixture then is pushed into the pressure relief recess (331). In other words, the waste mixture is rolled and pressed by the squeezing power generated by the forward spiral steps (441) and the backward spiral steps (442) in which each squeezing power of a backward step is equal to a quarter (¼) of the squeezing power of the forward step. Accordingly, water in the waste mixture is squeezed out and escapes through the primary water discharge holes (332) of the structural case (30) as well as through the second water discharge holes (412) of the shaft body (41). At the pressure relief recess (331), the waste mixture, after being rolled and pressed and water being discharged, will be released partially so that any inert waste components (such as plastic or plastic-covered waste) can be shattered and/or inflate while moving toward the pressure increase area (333) to be pressed and dewatered again. At the pressure increase area (333) the dehydrated waste mixture shall be continuously rolled and pressed by the forwarding spiral steps (441) and again pressurized due to the smaller gap between the shaft body (41) and the inner wall of the cylindrical body (31) by the reducing speed of the helix screw (44).

In the wet organic substance pressing zone (34), the dehydrated waste mixture is rolled and pressed again by the squeezing power generated by the forward-spiral steps (441) and the backward-spiral steps (442). At this zone (34), due to the smaller gap between the shaft body (41) and the inner wall of the cylindrical body (31) and the reducing speed of the helix screw (44), the waste mixture is under more squeezing and pressing power. This generates great heat to boil the waste mixture and therefore, breaks the structure of the water-bearing organic components, (i.e., food waste and plant waste). These water-bearing organic components are squeezed and discharged out through the organic-rich substance (liquid) separating holes (342).

At the pressure relief recess (341) and the pressure increase area (342) the operation process occurs similarly to that of the water separation zone (33) except that the pressure is now increased in this area.

In the heat and steam pressing zone (35) the operation process occurs similarly to the previous two zones. However, the pressure is much greater due to much smaller gap between the shaft body (41) and the inner wall of the cylindrical body (31) as well as the greater reducing speed of the helix screw (44). The greater pressure causes the squeezing and pressing of the wet organic components and at the same time causing the heat to boil any water left. Steam and heat are now released via the first heat and steam discharge holes (352) of the cylindrical body (31) and the second heat and steam discharge holes (413) of the shaft body (41). The waste mixture now becomes dry.

In the RDF molding and pelletizing zone (36), the operation process occurs similarly to the previous zones. At this time, the pressure is also much greater due to the smaller gap between the shaft body and the inner wall of the cylindrical body (31). The speed of the helix screw (44) is also reduced. In this zone (36), the dry waste mixture is now shaped into the dry and solid RDF by the pelletizing holes (361).

While the invention is described as the equipment for extracting, squeezing, compressing and compacting mixture of wet and dry municipal solid waste, it is understood that the equipment (and related processes) can also be used for any mixture of unidentified material components with high humidity such as straw, grass, wood chips or the like.

Although the invention has been described through the preferred embodiments with reference to accompanying drawings, it is understood that the invention may be amended, modified and replaced under the equivalent nature of the invention by those skilled in the art and nature of the invention. Thus the scope of the invention is defined by the attached claims.

What is claimed is:

1. A machine for processing a mixture comprising water and organic matter, the machine comprising:
  a stepless hydraulic power transmission module containing a hydraulic source unit and a stepless power hydraulic transmission unit having controllable speed and rotation;
  a squeeze and press compression module in the form of a structural case having a long hollow cylindrical shaped body and a shaft for pressing and squeezing the mixture disposed within the body and adapted for rotary motion therein;
  said body having a waste-inlet at one end, followed by a water separation zone, a wet organic substance pressing zone, a heat and steam pressing zone, and a refuse-derived fuel (RDF) molding and pelletizing zone, wherein said structural case is formed with alternating pressure relief recesses and pressure increase areas in the inner surface, and wherein the depth of each of the pressure increasing recesses gradually reduces from a smaller inner diameter end of the structural case to a larger inner diameter end of the structural case; and said shaft for pressing and squeezing the mixture is hollow and has a conical cylindrical shape with an increasing diameter and a shaft body that orients toward a substantially same direction as a direction of the structural case and a helix screw disposed on the surface of the shaft body where a pitch of said helix screw decreases toward a larger diameter end of the shaft body, wherein the helix screw comprises multiple spiral forward thread segments and multiple spiral backward thread segments with each forward thread segment paired with a backward thread segment in a single continuous helical section arranged with a space in between each forward thread segment and a previous backward thread segments, each spiral backward thread segment equal to ¼ of a spiral forward thread segment, and a spiral backward thread segment disposed on the shaft adjacent to a pressure relief recess of the structural case;

said processing comprises extracting, squeezing, compressing and compacting said mixture to provide both an organic-rich liquid and shaped, dry solid refuse-derived fuel (RDF) pellets.

2. The machine of claim 1, wherein the shaft body of the shaft for pressing and squeezing the mixture comprises an opened zone with a cone-shaped profile corresponding to an outer perimeter of the inside of the shaft body, and having water discharge holes and heat and steam discharge holes disposed on the shaft body.

3. The machine of claim 1, wherein the hydraulic source unit comprises a hydraulic oil tank, an oil pump, a hydraulic oil cooler mounted on the hydraulic oil tank to cool the hydraulic oil tank, and a two-way controller comprising an oil distribution valve and a pressure regulator valve.

4. The machine of claim 3, wherein the hydraulic source unit comprises
an oil pump having an electric motor with an output positioned above a cylinder head and an output shaft connected to the hydraulic oil tank;
bi-directional valves disposed on the side of and connected to the hydraulic oil tank, said valves controlling supply and recovery of hydraulic oil to the stepless power hydraulic transmission unit; and
a pair of oil pipes having inputs connected to the two-way controller to supply and control distribution of oil, and outputs.

5. The machine of claim 4, wherein the stepless hydraulic power transmission module comprises a gear box, a stepless hydro turbine having an output shaft connected to the gear box and an input shaft connected to said outputs of the pair of oil pipes.

6. The machine of claim 1, further comprising:
a first pressure increase area disposed between a pressure relief recess of the water separation zone and a pressure relief recess of the wet organic substance pressing zone;
a second pressure increase area disposed between the pressure relief recess of the wet organic substance pressing zone, and a pressure relief recess of the heat and steam pressing zone; and
a third pressure increase area disposed between the pressure relief recess of the heat and steam pressing zone and the RDF (refuse-derived fuel) molding and pelletizing zone.

7. The machine of claim 1, wherein a distance between the inner wall of the structural case and an outer surface of the shaft body reduces gradually corresponding with the cone-shaped profile of the shaft body.

8. The machine of claim 1, further comprising:
a plurality of first water separating holes disposed within a pressure relief recess of the water separation zone;
a plurality of organic substance separating holes disposed within a pressure relief recess of the wet organic substance pressing zone;
a plurality of first heat and steam discharge holes disposed within a pressure relief recess of the heat and steam pressing zone; and
a plurality RDF pellet holes for shaping dry and solid RDF (refuse-derived fuel) pellets disposed within the RDF (refuse-derived fuel) molding and pelletizing zone.

9. The machine of claim 1, wherein the structural case comprises a connection flange mounted to the gear box of the stepless hydraulic power transmission module, and wherein the structural case further comprises an inlet comprising a hopper disposed on an outer surface of the structural case and concentric with the inlet.

10. The machine of claim 5, wherein a first end of the shaft for pressing and squeezing the mixture is connected to a gear box output shaft end, the machine further comprising a blocking flange disposed between the shaft body and the body of the gearbox output shaft end, wherein the diameter of the flange is greater than the inner diameter of the case.

11. The machine of claim 8, wherein the shaft body comprises an inner hollow zone, said inner hollow zone being open at a larger-diameter end of the shaft body, a length of said inner hollow zone corresponding to the total length of a pressure relief recesses of the water separating zone, a pressure relief recesses of the organic substance pressing zone, a pressure relief recesses of the heat and steam pressing zone, and the RDF (refused-derived fuel) molding and pelletizing zone of the structural case.

12. The machine of claim 6, further comprising:
a plurality of water discharge holes disposed on the shaft body at the area corresponding to a pressure relief recess of the water separation zone; and
a plurality of second heat and steam discharge holes, disposed on the shaft body at the area corresponding to a pressure relief recess of the heat and steam pressing zone of the structural case.

* * * * *